United States Patent [19]

Zemel et al.

[11] Patent Number: 4,906,482

[45] Date of Patent: Mar. 6, 1990

[54] METHOD OF MAKING CALCIUM FORTIFIED SOY MILK AND THE CALCIUM FORTIFIED SOY MILK

[76] Inventors: Michael B. Zemel, 2856 Briarcliff, Ann Arbor, Mich. 48105; Leora A. Shelef, 3033 Morningview Ter., Birmingham, Mich. 48010

[21] Appl. No.: 230,313

[22] Filed: Aug. 9, 1988

Related U.S. Application Data

[63] Continuation of Ser. No. 713,536, Mar. 19, 1986, abandoned.

[51] Int. Cl.$^4$ .............................................. A23C 11/10
[52] U.S. Cl. ........................................ 426/74; 426/598
[58] Field of Search ............... 426/801, 580, 74, 330.3, 426/330, 598, 629, 634, 654

[56] References Cited

U.S. PATENT DOCUMENTS 4,389,425  6/1983  Burr ..................................... 426/598

OTHER PUBLICATIONS

Herotsuka et al., 1984 Calcium Fortification of Soy Milk with Calcium-Lecithen Liposome System J. Food Science 49:111.

Weingartner et al., 1983 Effects of Calcium Addition on Stability and Sensory Properties of Soy Beverage. J. Food Science 48:256.

*Primary Examiner*—Carolyn Paden
*Attorney, Agent, or Firm*—Ian C. McLeod

[57] ABSTRACT

Soy milk is calcium fortified by adding to the soy milk a polyphosphate and a human consumptible calcium source. The polyphosphate acts as a chelating agent for the calcium source while promoting microbial stability of the milk. The polyphosphate enables the calcium to be added in amounts such that the resulting product has calcium levels equal to or greater than that found in cow's milk.

20 Claims, No Drawings

METHOD OF MAKING CALCIUM FORTIFIED SOY MILK AND THE CALCIUM FORTIFIED SOY MILK

CROSS-REFERENCE TO RELATED APPLICATION

This application is a continuation of U.S. Ser. No. 713,536, filed Mar. 19, 1986 which is now abandoned.

BACKGROUND OF THE INVENTION

This invention relates to a method for calcium fortification of soy milk producing calcium levels equal to or greater than the calcium level found in bovine milk while preventing curdling of the milk proteins.

Soy milk is a water extract of soybeans which has been found to be nutritionally comparable to cow's milk in most respects. Since soy milk does not contain lactose and has no cholesterol, it is an ideal substitute for cow's milk for lactose-intolerant individuals and those on restricted cholesterol intake diets. Additionally, if problems pertaining to production and storage can be solved soy milk could provide an inexpensive and readily available protein source for individuals in developing nations.

Methods of extracting soy milk from the soybean are well known. Widespread acceptance of soy milk as a substitute for cow's milk has not been forthcoming because conventionally prepared soy milk is inferior to the conventional bovine milk in taste and in some nutritional aspects. Conventionally prepared soy milk contains approximately 12 percent of the available calcium found in bovine milk. Individuals substituting soy milk for bovine milk must supplement their calcium intake from other sources. Furthermore, conventionally prepared pasteurized soy milk is highly susceptible to bacterial growth and has an extremely short shelf life, which limits its dietary usefulness. Subjective factors have also prevented public acceptance of soy milk. Traditionally prepared soy milk may have a distinct odor and taste which differs from conventional cow's milk. The odor and taste have made soy milk less desirable than traditional bovine milk.

Attempts to fortify soy milk with additional calcium have been unsuccessful. Previous attempts to provide a stable soy milk having elevated calcium levels have resulted in coagulation and precipitation of soy protein via a protein-ionic calcium interaction.

Various chemicals have been employed to chelate calcium ions and prevent soy protein precipitation. Among these chemicals are citrates such as calcium citrate, ethylene diamine tetraacetic acid (EDTA) and alkali phosphates. U.S. Pat. Nos. 1,210,667 and 1,265,227 teach beverages containing calcium carbonate or calcium chloride as the calcium ion source and sodium phosphate as the chelating agent. Weingartner, et al proposes calcium citrate as a chelating agent (48 J. Food Sci. 256–263 (1983)). Hirotsuka, et al proposes a process which employs sonication of lecithin in a solution containing EDTA to envelope the calcium ions present in solution (49 J. Food Sci. 1111–1112, 1127 (1984)). These methods either do not yield a soy milk having calcium levels equal to or greater than bovine milk or require several complex steps impractical in general application. Several of the chelating agents previously employed reduce the bioavailability of the calcium ions in solution in the milk. Thus, while total calcium ion concentration in the milk may be increased dramatically over unfortified soy milk, a large portion of the added calcium remains nutritionally unavailable. Further, current methods yield a soy milk which is readily susceptible to bacterial growth unless sterilized.

Thus, it is desirable to provide a method for fortifying soy milk with calcium so that the soy milk has a calcium level equal to or greater than that found in bovine milk without coagulation of the soy protein and calcium. It is further desirable to employ agents to prevent coagulation which will provide minimal decrease in the bioavailability of the calcium present in the soy milk. It is also desirable to employ agents which will provide a bacteriostatic effect thereby increasing the resistance of the soy milk to bacterial growth. It is also desirable that these additives be either tasteless or aid in imparting a pleasant taste and odor to the soy milk.

SUMMARY OF THE INVENTION

In accordance with the present invention, soybean milk is calcium fortified by adding to the soy milk a water-soluble polyphosphate having from 3 to 22 phosphorous atoms and thereafter, adding to the soy milk a consumptible calcium source. The compounds are currently classified by the U.S Food and Drug Administration as "Generally Recognized as Safe" (GRAS).

Generally, the polyphosphate is employed in an amount ranging from about 0.5 to about 1.0 grams thereof per 100 mls. of soy milk.

The consumptible calcium source is employed in an amount ranging from about 0.2 grams to about 0.75 grams thereof per 100 mls. of soy milk.

The soy milk, per se, can be prepared by any suitable conventional method. Likewise, already available, commercial soy milk can be used herein.

For a more complete understanding of the present invention reference is made to the following detailed description and accompanying examples.

DESCRIPTION OF THE PREFERRED EMBODIMENTS

The present invention defines a method for preparing calcium fortified soy milk using a combination of polyphosphates and calcium salts and the soy milk product produced thereby. It has been found that polyphosphate salts exhibit the ability to chelate calcium ions in soy milk as well as to provide calcium in a highly bioavailable form. Furthermore, the use of polyphosphates has yielded an unexpected bacteriostatic effect when employed in the soy milk beverage. Thus, using a polyphosphate to aid in calcium fortification provides increased spoilage resistance, permits increased levels of calcium to be added to the soy milk without coagulating the soy proteins, and permits the digestion and ready utilization of the calcium in the body upon consumption.

The soy milk used herein can be prepared from any one of several methods known to those skilled in the art. Likewise, commercially available soy milk can be subjected to the present invention. A typical method for preparing soy milk, generally, comprises: (a) washing soybeans; (b) soaking the soybeans; (c) rinsing the beans to dehull them; (d) chopping the beans and adding water thereto to form a slurry thereof; (e) cooking the beans; (f) cooling the beans and (g) extracting the milk.

More particularly, raw soybeans are, first, rinsed in water with ample stirring to remove any dirt or debris which may be associated with the beans. Once the rinse water is removed, the cleaned soybeans are soaked in about three times their volume in water at about 4° C. for a period of about 12 to 18 hours to loosen the hulls.

After the soaking period, the water is decanted and discarded and the beans are rinsed to remove the softened hulls.

The dehulled beans, together with copious amounts of fresh water, are then, mixed and chopped to form a slurry. The amount of water required to form the slurry is determined to approximate the composition of cow's milk. Generally, an amount of water equal to about nine times the original weight of the beans prior to rinsing and soaking is used. The slurry can be formed by mixing the soybeans and water in a blender or similar device for approximately five minutes at low speed.

The slurry is, then, cooked at approximately 5 to 15 psi for between one-half to 2 minutes until a temperature between 220° F. and 260° F. is reached. The cooked slurry is, then, immediately cooled and transferred to a press where it is pressed and sieved to extract the milk and to separate the solids. This yields a soy milk suitable for further calcium fortification and treatment according to the present invention. However, as noted, any other mode for obtaining the soy milk can be used herein.

The calcium fortification is, generally, carried out at ambient temperatures while maintaining the pH of the soy milk between about 6.7 and about 6.85.

The calcium fortification of the soy milk is a two-step process of (a) adding the polyphosphate and (b) adding the calcium source thereto.

The polyphosphates have unexpectedly been found to be superb agents for chelation of calcium ions in soy milk and, concommitantly, act to retard bacterial growth. The polyphosphates used herein are either straight chain or cyclic compounds having a chain length from about 3 to about 22 phosphates and which have good dissociation characteristics in water. For these reasons, alkali metal polyphosphates are prefered. Representative alkali metal polyphosphates useful herein include sodium tripolyphosphate, sodium hexametaphosphate, potassium tripolyphosphate, potassium hexametapolyphosphate and the like, as well as mixtures thereof. Usually, an amount ranging from about 0.5 to about 1.0 gram of polyphosphate salt per 100 mls. of milk is added.

The polyphosphate is added to the soy milk by the direct addition thereof, such as by mixing, stirring, etc.

After the polyphosphate addition, or concurrently with it, the calcium source is added to the soy milk.

Any water-soluble calcium salt suitable for human consumption may be used herein. The source of calcium is preferably taken from the group which includes calcium chloride, calcium carbonate, calcium gluconate, calcium lactate, calcium phosphate, calcium citrate and mixtures thereof. In the preferred embodiment calcium chloride is used. The calcium source is used in an amount ranging from about 0.2 grams to about 0.75 grams per 100 mls. of soy milk.

Calcium addition is, also, achieved directly by adding the calcium source to the soy milk with mixing, stirring, etc.

The fortified soy milk may be homogenized using a single stroke homogenizer or other appropriate method and may be pasteurized or sterilized according to conventional methods.

Addition of polyphosphate and calcium salts according to the present invention permits production of a stable pasteurized soy milk product containing up to about 1.7 mg. calcium per ml. of soy milk having a refrigerated shelf-life of approximately three weeks. Alternately, a sterilized calcium fortified soy milk with an extended shelf-like at room temperature may be provided. The calcium levels are approximately 50 to 70 percent greater than is found in cow's milk. A product fortified at this level would permit one to meet the recommended dietary allowances (RDA) for calcium by consuming approximately one pint of fortified soy milk per day.

Additional flavoring agents and sweeteners can be added to the soy milk to provide a suitable tasting beverage. Usually, any amount up to about 7 grams of conventional sweeteners per 100 mls. of soy milk may be added. The sweetener can be either a mono-saccharide or di-saccharide such as glucose, fructose or sucrose, or it may be one of the commercially available artificial sweeteners such as saccharin or aspartame. Various optional flavorings can be added as desired. Such flavorings include vanilla, chocolate, strawberry or other compatible food additives.

It should, also, be noted with respect hereto that milk product derivatives such as ice-cream, yogurt, etc. can be prepared from the fortified soy milk hereof.

For a more complete understanding of the present invention reference is made to the following examples. The examples are to be construed as illustrative and not limitative of the present invention.

STANDARD ANALYTICAL METHOD FOR DETERMINING CALCIUM ION CONCENTRATION

A Perkin-Elmer Model 305 atomic absorption spectrophotometer is used. Calibration of the spectrophotometer is accomplished using a calcium carbonate standard solution containing 100 ppm $Ca^{++}$. Measured amounts of the working solution are diluted with a 0.5 percent $LaCl_3$ solution to 10 ml.

The absorbance of the standards at 422.7 nm is recorded. The K value (i.e., slope of the standard curve) of each standard is determined and plotted by dividing the known calcium concentration by the absorbance.

To determine calcium concentration of a sample, a measured portion of the sample (usually between 0.01 and 2 ml.) is pipetted into a 10 ml. volumetric flask containing 1.0 ml. of a 5.0 percent $LaCl_3$ solution. The sample is then diluted to the 10 ml. mark.

The diluted sample of the solution is then aspirated into the air-acetylene flame of the spectrophotometer and the absorbance at 422.7 nm recorded. The calcium concentration of the dilute solution can then be determined by applying the regression coefficient from the standard curve to the sample absorbance. Multiplication of this concentration value by the dilution factor will give total calcium in $\mu g/ml$.

EXAMPLE I

One thousand three hundred and fifty mls. of untreated soy milk was divided into three aliquots; two 600 ml. aliquots and one 150 ml. aliquot. Sucrose was then added to the two 600 ml. aliquots to yield a sucrose concentration in the soy milk equal to 70 g. sucrose/L.

One of the two 600 ml. sweetened aliquots was then divided into two 300 ml. portions. Portion A which was to serve as a control in the procedure was then pasteurized according to known conventionally employed procedures. Portion B which also served as a control was homogenized and then pasteurized by conventional methods.

The unsweetened 150 ml. aliquot labeled Portion C was similarly pasteurized.

The second 600 ml. sweetened aliquot was calcium fortified according to this invention. To the 600 ml. aliquot was added 4.5 gms. of sodium tripolyphosphate and 2.496 g. calcium chloride, with continuous stirring to ensure proper mixing. The second aliquot was then divided into two 300 ml. portions which were labeled Portion D and Portion E. Portion D was pasteurized by the same method employed in treating Portion A. Portion E was homogenized and then pasteurized by the method employed with Portion B.

The calcium contents of the three soy milk Portions B, D and E were analyzed according to the standard calcium concentration method. A calibration curve was prepared using a 100 ppm. standard solution diluted to various parts per million levels in a 0.5 percent $LaCl_3$ solution. The concentrations absorbance and K values are listed in Table I. The dilution factors absorbances and concentrations of soy milk Portions B, D and E are listed in Table II. Each sample was run in multiples and the average absorbance of the runs was used to calculate the calcium concentration.

TABLE I
CALCULATION OF CALCIUM CALIBRATION STANDARD

| Calcium Concentration(C) (ppm.) | Absorbance (ABS) | K Value | C (ABS) |
|---|---|---|---|
| 1 | 0.035 | 28.57 | |
| 2 | 0.073 | 27.40 | |
| 3 | 0.107 | 28.04 | |
| 4 | 0.146 | 27.40 | |
| 5 | 0.184 | 27.17 | |
| 6 | 0.219 | 27.40 | |
| | | K̄ 27.66 | |

TABLE II
CALCIUM CONCENTRATION OF SOY MILK SAMPLES

| Sample | Absorbance | Average Absorbance | C Value | Dilution Factor | Calcium Concentration (g/ml) |
|---|---|---|---|---|---|
| Portion B (Sweetened/ untreated) | 0.097 0.095 0.095 | 0.0957 | 2.65 | 1:50 | 132.32 |
| Portion D (Sweetened/ treated) | 0.073 0.085 0.089 0.093 0.100 | 0.088 | 2.43 | 1:500 | 1217:15 |
| Portion A (Unsweetened/ Untreated) | 0.064 0.061 0.066 | 0.0637 | 1.76 | 1:100 | 176.12 |

EXAMPLE II

A procedure similar to that of Example I was performed on the following 450 ml. samples:

I. Soy milk with a sucrose concentration of 70 grams per liter.

II. Soy milk with a sucrose concentration of 70 grams per liter to which 3.375 grams of sodium tripolyphosphate and 1.872 grams of $CaCl_2$ have been added.

III. Soy milk with a sucrose concentration of 70 grams per liter to which 2.25 grams of sodium tripolyphosphate and 0.846 grams of $CaCO_3$ and 0.936 grams $CaCl_2$ have been added; and IV. Soy milk with a sucrose concentration of 70 grams per liter to which 3.375 grams of sodium tripolyphosphate and 1.692 grams of $CaCO_3$ have been added.

All samples were then homogenized and pasteurized. The results are set forth in Table III.

TABLE III
CALCIUM CONCENTRATION OF SOY MILK SAMPLES
(Average K value = 25.81)

| Sample | Absorbance | Average Absorbance | C Value | Dilution Factor (ml.) | Calcium Concentrate (mg/ml) |
|---|---|---|---|---|---|
| I | 0.112 0.110 0.112 0.110 0.112 | 0.1112 | 2.87 | 1:50 | 0.14 |
| II | 0.128 0.124 0.124 0.125 0.126 | 0.125 | 3.23 | 1:500 | 1.61 |
| III | 0.055 0.056 0.057 0.056 0.052 | 0.0552 | 1.42 | 1:500 | 0.71 |
| IV | 0.018 0.017 0.016 0.017 0.017 | 0.017 | 0.44 | 1:500 | 0.22 |

EXAMPLE III

Aliquots of sweetened, untreated soy milk (Portion B) and sweetened, calcium-tripolyphosphate treated soy milk (Portion D) prepared in Example I were stored in a refrigerator for eight (8) weeks and periodically sampled for total aerobic microbial counts. Growth was evaluated on plate count agar after forty-eight (48) hours of incubation at 37° C. and is expressed as colony-forming units, of representative samples (each performed in multiple) as set forth in Table IV.

TABLE IV
BACTERIAL GROWTH IN SOY MILK

| | Type of Treatment | |
|---|---|---|
| Length of Refrigeration (day) | B-Conventional (Colony-Forming Units/ml) | D Calcium Tripolyphosphate Treated (Colony-Forming Units/ml) |
| 10 | 0 | 0 |
| 12 | 2 | 0 |
| 14 | $3 \times 10^2$ | 0 |
| 56 | $6 \times 10^2$ | 0 |

EXAMPLE IV

When the procedure outlined in Example I is repeated, and 4.5 gms of sodium hexametaphosphate and 2.5 gms of calcium carbonate are added to a 600 ml. aliquot of sweetened soy milk, results similar to those outlined in Tables I through IV are observed.

EXAMPLE V

When the procedure outlined in Example IV is repeated using potassium tripolyphosphate and calcium citrate, results similar to those outlined in Tables I through IV are observed.

We claim:

1. A method of manufacturing fortified soy milk comprising the steps of:
   (a) first, adding to a soy milk an amount of an alkali metal polyphosphate salt effective to directly suppress aggregation between soy milk constituents and added calcium ions;
   (b) adding an amount of a human consumable calcium source between about 0.2 grams and about 0.75 grams calcium source per 100 mls. of soy milk concurrently with or after the adding of the alkali metal polyphosphate salt, wherein the calcium source is in a soluble form in the presence of the alkali metal polyphosphate salt and provides a calcium level substantially greater than cow's milk;
   (c) sterilizing or pasteurizing the soy milk containing the alkali metal polyphosphate salt and the calcium source; and
   (d) cooling the pasteurized or sterilized soy milk to refrigeration temperatures, wherein calcium in the calcium source remains dissolved in the soy milk.

2. The method of claim 1 wherein the alkali metal polyphosphate salt is present in an amount ranging from about 0.5 gram to about 1.0 gram thereof per 100 mls of soy milk.

3. The method of claim 1 wherein the alkali metal polyphosphate salt has the general formula:

$$Z[PO_3]_x:$$

wherein Z is an alkali metal cation selected from the group consisting of sodium and potassium and x is an integer between three and twenty-two.

4. The method of claim 3 wherein the alkali metal polyphosphate salt is selected from the group consisting of sodium tripolyphosphate, sodium hexametaphosphate, potassium tripolyphosphate and potassium hexametaphosphate and mixtures thereof.

5. The method of claim 4 wherein the alkali metal polyphosphate salt is sodium tripolyphosphate.

6. The method of claim 1 wherein the pH of the soy milk is maintained in the range of about 6.7 to about 6.85.

7. The method of claim 1 wherein the calcium source is selected from the group consisting of calcium carbonate, calcium gluconate, calcium phosphate, calcium citrate and calcium chloride and mixtures thereof.

8. The method of claim 7 wherein the calcium salt is calcium chloride.

9. The method of claim 1 wherein the soy milk containing the alkali metal polyphosphate salt and calcium source is homogenized before sterilizing or pasteurizing.

10. The method of claim 9 wherein a flavor and sugar is added to the soy milk before the homogenizing.

11. A method for improving the microbiological stability and calcium fortification of soy milk comprising the steps of:
   (a) adding to a soy milk an amount of an alkali metal polyphosphate salt effective to directly suppress aggregation between the soy milk and calcium ions;
   (b) adding an amount of a human consumable calcium source sufficient to provide a calcium level substantially greater than about 120 mg calcium per 100 ml soy milk in the soy milk either concurrently with or after the adding of the alkali metal polyphosphate salt, wherein the calcium source is in a soluble form in the presence of the alkali metal polyphosphate salt;
   (c) sterilizing or pasteurizing the soy milk containing the alkali metal polyphosphate salt and calcium source; and
   (d) cooling the pasteurized or sterilized soy milk to refrigeration temperatures, wherein calcium in the calcium source remains dissolved in the soy milk.

12. The method of claim 11 wherein the alkali metal polyphosphate is present in an amount ranging from about 0.5 gram to about 1.0 gram per 100 mls. of soy milk.

13. The method of claim 12 wherein the alkali metal polyphospate salt has the general formula:

$$Z[PO_3]_x:$$

wherein Z is an alkali metal cation selected from the group consisting of sodium and potassium and x is an integer between three and twenty-two.

14. The method of claim 13 wherein the alkali metal polyphosphate salt is sodium tripolyphosphate.

15. The method of claim 11 wherein the soy milk containing the alkali metal polyphosphate salt and calcium source is homogenized before the sterilizing or pasteurizing.

16. The method of claim 15 wherein a flavor and sugar is added to the soy milk before the homogenizing.

17. A calcium fortified soy milk with increased microbiological stability consisting essentially of:
   aqueous soy milk;
   from about 0.5 gram to about 1.0 gram per 100 ml soy milk of an alkali metal polyphosphate salt having the general formula:

$$Z[PO_3]_x$$

wherein Z is an alkali metal selected from the group consisting of sodium and potassium and x is an integer between three and twenty-two; and
   a human consumable water-soluble calcium salt selected from the group consisting of calcium chloride, calcium carbonate, calcium gluconate, calcium lactate, calcium phosphate, calcium citrate and mixtures thereof, the calcium salt being present in an amount ranging from about 0.2 gram to about 0.75 gram per 100 mls. of aqueous soy milk and provides a calcium level substantially greater than cow's milk;
   wherein the calcium salt is in a soluble form in the presence of the alkali metal polyphosphate salt;
   wherein the soy milk with the alkali metal polyphosphate salt and calcium source has been sterilized or pasteurized and cooled to refrigeration temperatures; and wherein the calcium in the calcium source remains dissolved in the soy milk.

18. The calcium fortified soy milk with increased microbiological stability of claim 17 wherein the aqueous soy milk has a pH of about 6.7 to about 6.85.

19. The calcium fortified soy milk with increased microbiological stability of claim 18 wherein the alkali metal polyphosphate salt is selected from the group consisting of sodium tripolyphosphate, sodium hexametaphosphate, potassium tripolyphosphate and potassium hexametaphosphate and mixtures thereof.

20. The calcium foritifed soy milk of claim 17 wherein the alkali metal polyphosphate is sodium tripolyphosphate.

* * * * *